US012699563B2

(12) United States Patent
Caban Babilonia et al.

(10) Patent No.: US 12,699,563 B2
(45) Date of Patent: Aug. 4, 2026

(54) GENERATING PERFORMANCE METRICS TO FACILITATE LARGE LANGUAGE MODEL OPERATIONS

(71) Applicant: Red Hat, Inc., Raleigh, NC (US)

(72) Inventors: William J. Caban Babilonia, Annapolis, MD (US); Erik M. Jacobs, Atlanta, GA (US); Guarav Singh, Columbus, OH (US); Benjamin Michael Parees, Raleigh, NC (US)

(73) Assignee: Red Hat, Inc., Raleigh, NC (US)

( * ) Notice: Subject to any disclaimer, the term of this patent is extended or adjusted under 35 U.S.C. 154(b) by 225 days.

(21) Appl. No.: 18/584,857

(22) Filed: Feb. 22, 2024

(65) Prior Publication Data

US 2025/0272093 A1    Aug. 28, 2025

(51) Int. Cl.
*G06F 8/77*        (2018.01)
*G06N 3/0895*      (2023.01)

(52) U.S. Cl.
CPC ............. *G06F 8/77* (2013.01); *G06N 3/0895* (2023.01)

(58) Field of Classification Search
None
See application file for complete search history.

(56) References Cited

U.S. PATENT DOCUMENTS

| | | | |
|---|---|---|---|
| 2024/0303421 A1* | 9/2024 | Fabian | ................... G06F 40/284 |
| 2024/0378394 A1* | 11/2024 | Kotikalapudi | .......... G06F 40/40 |
| 2025/0124236 A1* | 4/2025 | Gupta | ................... G06F 40/103 |
| 2025/0217126 A1* | 7/2025 | Hicks | ................. G06F 11/3604 |

* cited by examiner

*Primary Examiner* — Qing Chen

(74) *Attorney, Agent, or Firm* — Kilpatrick Townsend & Stockton LLP

(57) ABSTRACT

A system can be provided for to evaluating artificial intelligence (AI) generated structure language files. For example, the system can receive a first structured language file generated by a large language model (LLM). The first structured language file can include generated keys and generated values for a resource. The system can also receive a second structured language file, which can include test keys and test values for the resource. The system can further extract, using a schema for the resource, resource keys. The system can determine, based on a comparison of the generated keys and the resource keys, a valid key total. Similarly, the system can determine, based on a comparison of the generated values and the test values, a valid value total. The system can then generate performance metrics for the LLM. Each performance metric can depend on the valid key total or the valid value total.

17 Claims, 4 Drawing Sheets

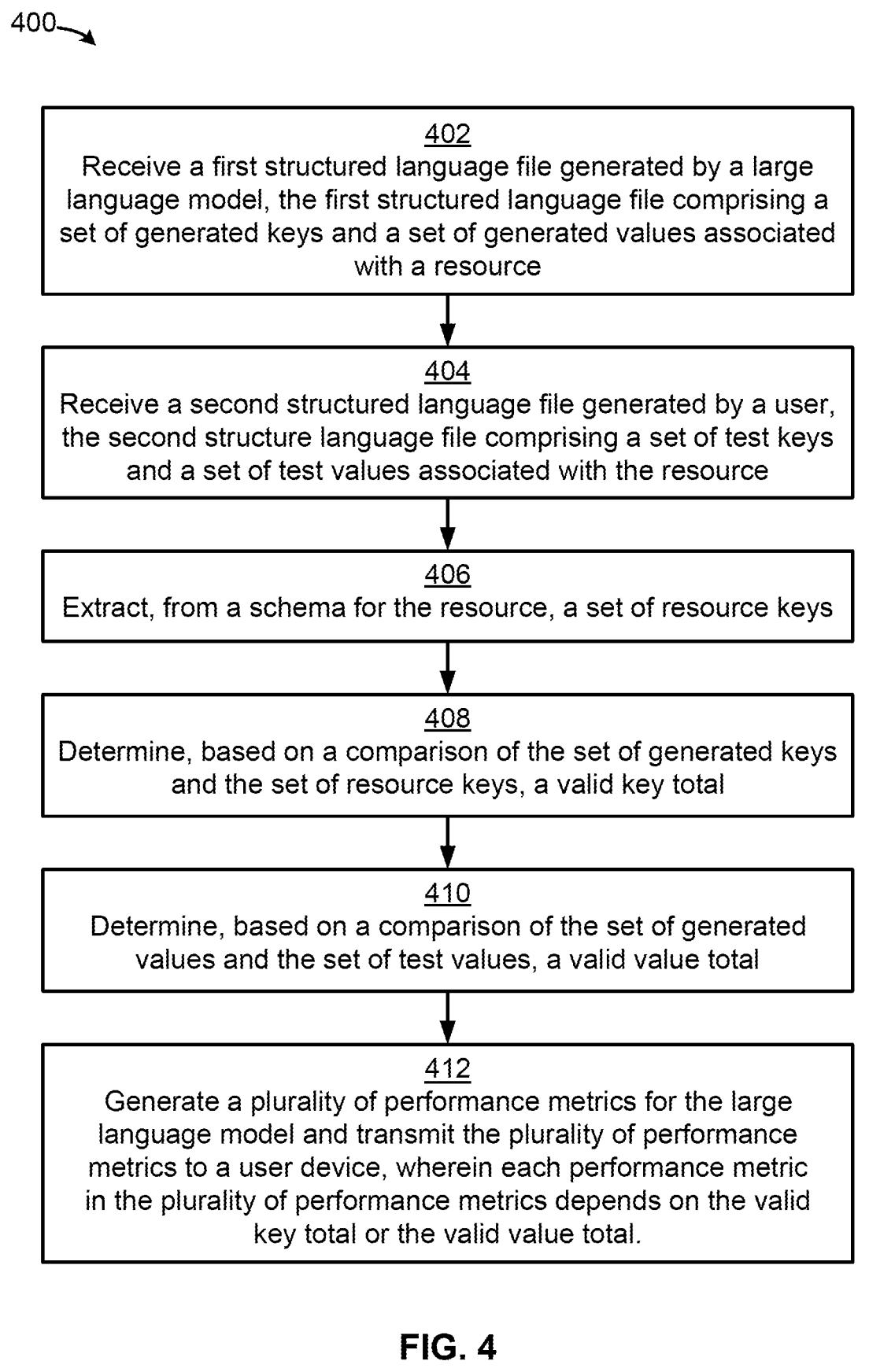

400

```
┌─────────────────────────────────────────────────────┐
│                        402                            │
│  Receive a first structured language file generated   │
│  by a large language model, the first structured      │
│  language file comprising a set of generated keys     │
│  and a set of generated values associated with a      │
│  resource                                             │
└─────────────────────────────────────────────────────┘
                          │
                          ▼
┌─────────────────────────────────────────────────────┐
│                        404                            │
│  Receive a second structured language file generated  │
│  by a user, the second structure language file        │
│  comprising a set of test keys and a set of test      │
│  values associated with the resource                  │
└─────────────────────────────────────────────────────┘
                          │
                          ▼
┌─────────────────────────────────────────────────────┐
│                        406                            │
│  Extract, from a schema for the resource, a set of    │
│  resource keys                                        │
└─────────────────────────────────────────────────────┘
                          │
                          ▼
┌─────────────────────────────────────────────────────┐
│                        408                            │
│  Determine, based on a comparison of the set of       │
│  generated keys and the set of resource keys, a       │
│  valid key total                                      │
└─────────────────────────────────────────────────────┘
                          │
                          ▼
┌─────────────────────────────────────────────────────┐
│                        410                            │
│  Determine, based on a comparison of the set of       │
│  generated values and the set of test values, a       │
│  valid value total                                    │
└─────────────────────────────────────────────────────┘
                          │
                          ▼
┌─────────────────────────────────────────────────────┐
│                        412                            │
│  Generate a plurality of performance metrics for the  │
│  large language model and transmit the plurality of   │
│  performance metrics to a user device, wherein each   │
│  performance metric in the plurality of performance   │
│  metrics depends on the valid key total or the valid  │
│  value total.                                         │
└─────────────────────────────────────────────────────┘
```

FIG. 4

GENERATING PERFORMANCE METRICS TO FACILITATE LARGE LANGUAGE MODEL OPERATIONS

TECHNICAL FIELD

The present disclosure relates generally to software development and, more particularly (although not necessarily exclusively), to generating performance metrics to facilitate large language model (LLM) operations.

BACKGROUND

Large language models (LLMs) are a type of artificial intelligence built upon complex deep learning architectures designed to understand, interpret, generate, and interact with human language. The LLMs can be trained on extensive corpuses of data to enable the LLMS to learn language patterns, syntax, and semantics. In some examples, the LLMs can be trained to generate code in one or more structured languages. Examples of structure languages include Yet Another Markup Language (YAML), Extensible Markup Language (XML), and Java Script Object Notation (JSON). In such examples, the LLMs can be trained using datasets consisting largely of structure language examples to enable the LLMs to understand and generate specific syntax and structures used in the structured languages.

BRIEF DESCRIPTION OF THE DRAWINGS

FIG. 4 is a flowchart of an example of a process for generating performance metrics to facilitate LLM operations according to some embodiments of the present disclosure.

DETAILED DESCRIPTION

Figure 1:
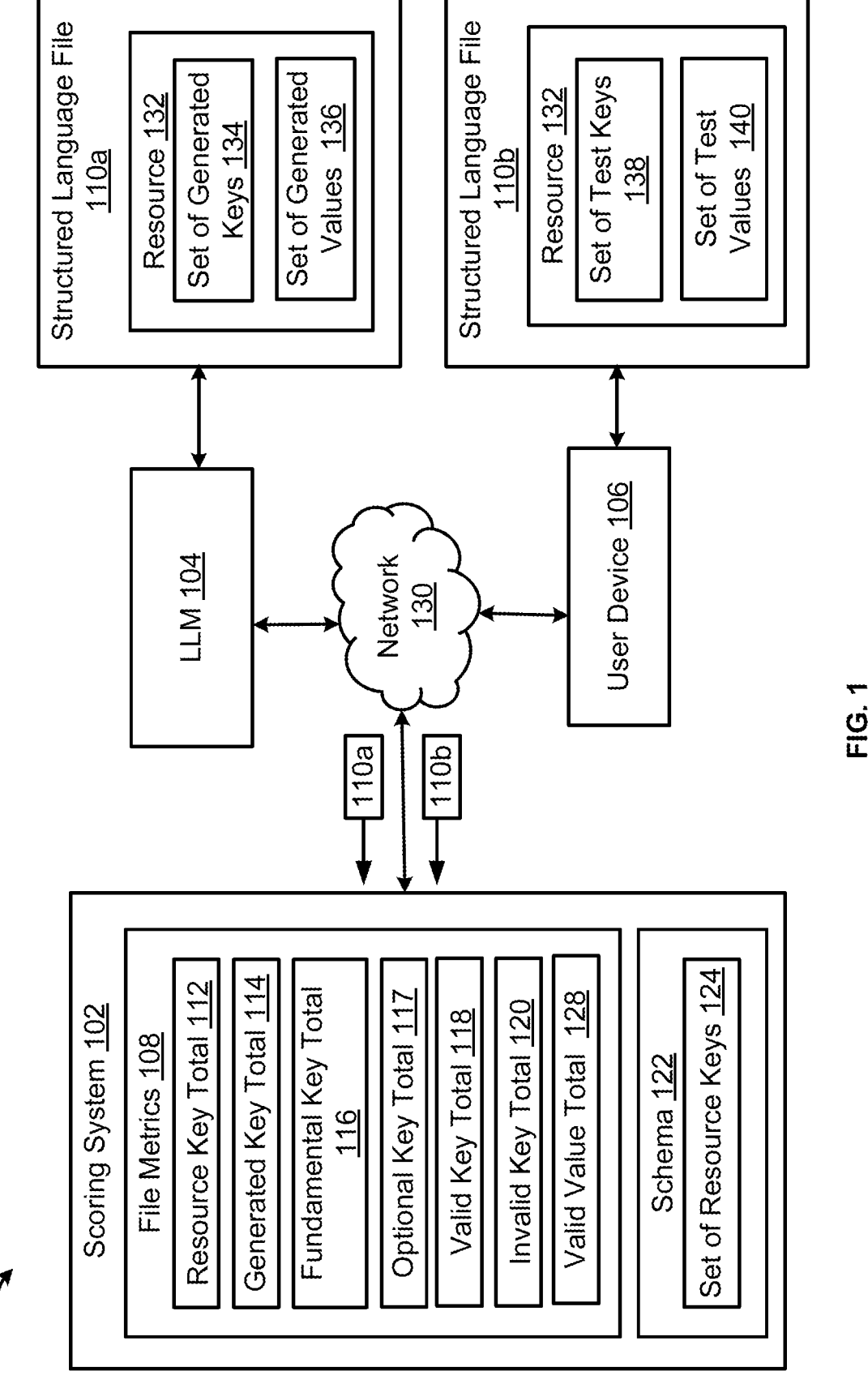
FIG. 1 is a block diagram of an example of a computing environment for generating file metrics to facilitate large language model (LLM) operations according to some embodiments of the present disclosure.

The ability of artificial intelligence (AI) (e.g., machine learning (ML) models) to generate accurate and useful code can be measured by computing various metrics. For example, an accuracy of a ML model can be estimated by dividing a number of accurate code outputs by a total number of code outputs. To determine which code outputs are accurate, current systems may perform a direct comparison of a ML model generated code file to a corresponding, human-generated code file that is considered accurate. In doing so, the current systems can determine whether the ML model generated code and the human-generated code are an identical match by syntax and text. However, with some coding languages (e.g., structured languages), there can be differences among code files that do not affect an accuracy or usefulness of the code files. For example, with structured languages, there may be different ways to represent the same values (e.g., different ways to represent arrays) or characteristics that do not have relevance (e.g., an order of keys). Thus, when performing the direct comparison of the ML model generated code file and the human-generate code file, the current systems may incorrectly classify accurate code as inaccurate based on the differences that do not impact the accuracy and usefulness. As a result, the current systems cannot properly evaluate (e.g., quantify with the metrics) the ability of ML models to generate accurate and useful code. Thus, the current systems may not be able to properly measure improvements, detect drifts, or the like during machine learning model training and operation. Additionally, the current systems may overestimate the inaccuracy of the ML model outputs, which can lead to inefficient training of ML models.

Some examples of the present disclosure can overcome one or more of the issues mentioned above via a scoring system that can generate performance metrics to measure improvements, detect drifts, or the like of AI models (e.g., large langue models (LLMs)) during training and operation. For example, the scoring system can identify keys and values in a structured language file generated by an AI model (e.g., a large language model (LLM)). The scoring system can then evaluate whether the keys and values are valid. The scoring system can then use at least the number of valid values generated, the number of valid keys generated, the total number of keys generated, the total number of values generated, other suitable quantities, or a combination thereof to compute performance metrics. In this way, the structured language file can be evaluated based the existence of valid keys and values generated rather than on a direct comparison of the structured language file to another structured language file. Consequently, the evaluation of the structured language file cannot be negatively impacted by insignificant differences (e.g. a value being represented as a string instead of a quoted string or the keys being in a different order). Thus, the scoring system can properly quantify, with the performance metrics, whether a code file generated by the AI model is accurate and useful, which, in turn, improves an overall evaluation of the AI model's ability to generate code.

Additionally, due to the scoring system properly evaluating whether a code file generated by the AI model is accurate and useful, the scoring system may not overestimate the inaccuracy of AI models. Thus, the efficiency of model training can be improved. To further improve model training, the scoring system may, in some examples, produce a model training recommendation based on the performance metrics. For example, the model training recommendation may indicate that the model is ready for deployment or that the model may require further training on a particular type of structured language. Thus, the scoring system can facilitate efficient and targeted training of the AI models.

In one particular example, a LLM may generate a (Yet Another Markup Language) YAML configuration file. For example, the LLM may generate the YAML configuration file in response to a user request for a YAML configuration file for a basic web application. A scoring system can receive the LLM-generated YAML file and analyze the file to detect one or more resources and key-value pairs. In the particular example, the scoring system may detect a first resource ("webserver") and a second resource ("database"). The first resource can include a first key ("name"), a second key ("IP address"), and corresponding values. The second resource can include a third key ("type"), a fourth key ("host"), and corresponding values. The keys and corresponding values for each resource can provide specific configuration settings (e.g., the webserver at which the application is hosted, the type of database, and server at which the database is hosted).

In the particular example, the scoring system can also receive a human-generated version of the YAML configuration file. Similar to the LLM-generated file, the scoring system can analyze the human-generated version to detect one or more resources and key-value pairs in the file. For example, the system may detect the first resource (e.g., "webserver") and the second resource (e.g., "database") in the human-generated file. The first resource in the human-generated value can consist of the first key, a fifth key ("port"), and corresponding values. The database resource can include the third key, the fourth key, a sixth key ("port"), and corresponding values.

The scoring system can further access a schema for each resource, which can outline resource keys that can be included in an instance of the resource. In the example, the schema may indicate a set of fundamental keys which may be the minimum set of keys needed to create a valid instance of the resource. For example, based on the schema, the scoring system can determine that the first key and the fifth key may be fundamental keys for the first resource and that the third key, the fourth key, and the sixth key may be fundamental keys for the second resource. The scoring system can further determine, based on the resource keys, that the first key is valid and the second key is invalid (e.g., "IP Address" is excluded from the resource keys included in the schema for the first resource). The scoring system can further compare the corresponding values in the LLM-generated file to the corresponding values in the human-generated file. As a result, the scoring system can determine that a value corresponding to the second key is invalid (e.g., the corresponding values in the human-generated file do not include the same or a similar value). Additionally, the scoring system can identify that the sixth key is a fundamental key and that the sixth key is missing from the LLM-generated file. Thus, the scoring system can determine that three of the four keys in the LLM-generated YAML file are valid, three of the four values in the LLM-generated YAML file are valid, and that the YAML file includes four of the five fundamental keys for the two resources.

The scoring system can then generate performance metrics for the LLM based on the valid keys and valid values. For example, the performance metrics can include a hallucination score indicative how many invalid keys the LLM added to the YAML configuration file. To generate the hallucination score, the scoring system can compute a difference between a number of generated keys (e.g., 4) and a number of valid keys (e.g., 3). Then, the hallucination score can be the ratio of the difference to a total number of resource keys indicated as valid by the schemas. Thus, if for example the total number of resource keys is 15, the hallucination score can be equal to $\frac{1}{15}$ or 7%. Additionally, the performance metrics can include a minimum valid generation score. To generate the minimum valid generation score, the scoring system can compute a difference between a number of fundamental keys (e.g., 5) and the four fundamental keys successfully generated by the LLM. Then, the minimum valid generation score can be the ratio of the difference to the number of fundamental keys. Thus, in the example, the minimum valid generation score can be $\frac{1}{5}$ or 20%. The system can then transmit the performance metrics to a user device. The performance metrics can be used to analyze the strengths and weaknesses of the LLM to facilitate effective training, deployment, and use of the LLM.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

FIG. 1 is a block diagram of an example of a computing environment 100 for generating file metrics 108 to facilitate large language model (LLM) operations according to some embodiments of the present disclosure. The LLM operations can include training of the LLM 104, re-training of the LLM 104, gating or guiding the deployment or removal of the LLM 104 into or from production, or other suitable operations. Components within the computing environment 100 may be communicatively coupled via a network 130, such as a local area network (LAN), wide area network (WAN), the Internet, or any combination thereof. For example, the computing environment 100 can include a scoring system 102, an artificial intelligence (AI) model (e.g., the LLM 104, a recurrent neural network, a transformer-based model, a reinforcement learning model, a generative adversarial network, etc.), and a user device 106 that are communicatively coupled through the network 130. Examples of the user device 106 can include a desktop computer, laptop computer, server, mobile phone, tablet, or electronic control unit (ECU). The computing environment 100 may further be formed from a physical infrastructure that includes various network hardware, such as routers, hubs, bridges, switches, and firewalls. The physical infrastructure can also include one or more servers. The servers may provide backend support for the LLM 104, the scoring system 102, or a combination thereof.

In some examples, the LLM 104 can be trained to generate structured language files. For example, the LLM 104 can be trained on a dataset consisting largely of structured language files to cause the LLM 104 to be adept at understanding and generating specific syntax and structures used in structured languages. Thus, after training, the LLM 104 can output code (e.g., data) in a structured language (e.g., Extensive Markup Language (XML), JavaScript Object Notation (JSON), Yet Another Markup Language (YAML), Hypertext Markup Language (HTML), or the like). The LLM 104 can be trained on any number of structured languages. The structured language files generated by the LLM 104 can be in any suitable format and may be stored in volatile or non-volatile memory. For example, the structure language files can be text files or other suitable file types containing the code in the structured format. The purpose of the structured language files can further be to store data (e.g., data files), configuration settings (e.g., configuration files), or the like.

In some examples, the scoring system 102 can be executed to analyze and estimate error, accuracy, or other suitable performance metrics for structured language files generated by the LLM 104. The performance metrics can be used, by the scoring system 102, to evaluate (e.g., quantify) an ability of the LLM 104 to generate structured language files. The scoring system 102 may further plan the development, training, or deployment of the LLM 104 based on the performance metrics. For example, the scoring system 102 may indicate, based on the performance metrics, that the LLM 104 is ready for deployment or that the LLM 104 requires further training. As a result, the effectiveness of the LLM 104 in generating accurate and reliable structured language files can be maximized.

In an example, the scoring system 102 can receive a first structured language file 110a generated by the LLM 104. The first structured language file 110a can include a set of generated keys 134 and a set of generated values 126. Each value in the set of generated values 136 can be paired with a key in the set of generated keys 134. The key and value pairs can be associated with a resource 132. The set of generated keys 134 can identify data items, parameters, or settings within the resource 132. The generated values 136 can be strings, numbers, arrays, or the like which specify the data item, setting, or parameter to create an instance of the resource 132. The resource 132 can be an object, component, service, or entity which the key and value pairs collectively represent. For example, in the context of a configuration file, a resource can be a database connection and the key and value pairs can specify the type of database, the name of the database, authentication information for the database, etc.

After receiving the first structured language file 110a, the scoring system 102 can determine (e.g., receive or access) a schema 122 for the resource 132. The schema 122 can govern the format and constraints of key and value pairs which represent the resource 132. The schema 122 can further include a set of resource keys (e.g., settings, parameters, etc.) that can be used to represent the resource 132. Within the set of resource keys 124, there can be a first subset of resource keys that may be mandatory to create a valid instance of the resource 132 and a second subset of resource keys that can be optionally included in a valid instance of the resource 132.

The scoring system 102 can further determine various file metrics 108 based on the set of generated keys 134, the set of generated values 136, the set of resource keys 124, or a combination thereof. For example, the scoring system 102 can determine a generated key total 114 representative of a number of keys in the set of generated keys 134. The scoring system 102 can further determine a valid key total 118 representative of a number of keys in the set of generated keys 134 that are valid based on the schema 122. In particular, to determine the valid key total 118, the scoring system 102 can determine whether each key in the set of generated keys 134 at least partially matches a key in the set of resource keys 124 of the schema 122. Each key that does at least particularly match a key in the set of resource keys 124 can be identified as a valid key, and therefore contribute to the valid key total 118. The scoring system may further subtract the valid key total 118 from the from the generated key total 114 to establish an invalid key total 120. Moreover, the scoring system 102 can determine a resource key total 112 representative of a number of keys in the set of resource keys 124, a fundamental key total 116 representative of a number of keys in the first subset of resource keys, and an optional key total 117 representative of a number of keys in the second subset of resource keys.

The scoring system 102 may further receive a second structured language file 110b. For example, the second structured language file 110b can be a human-generated version of the first structured language file 110a transmitted to the scoring system 102 by the user device 106. Thus, the second structured language file 110b can include a set of test keys 138 and a set of test values 140 for the resource 132, which the scoring system 102 can compare to the set of generated keys 134 and the set of generated values 136. For example, the scoring system 102 can use regular expression (regex) to determine whether each value in the set of generated values 136 at least partially matches a test value in the set of test values 140. Each generated value that does at least particularly match a value in the set of test values 140 can be considered a valid value. Thus, the file metrics 108 determined by the scoring system 102 may further include valid values total 128 to indicate a number of valid values in the set of generated values 136.

Figure 2:
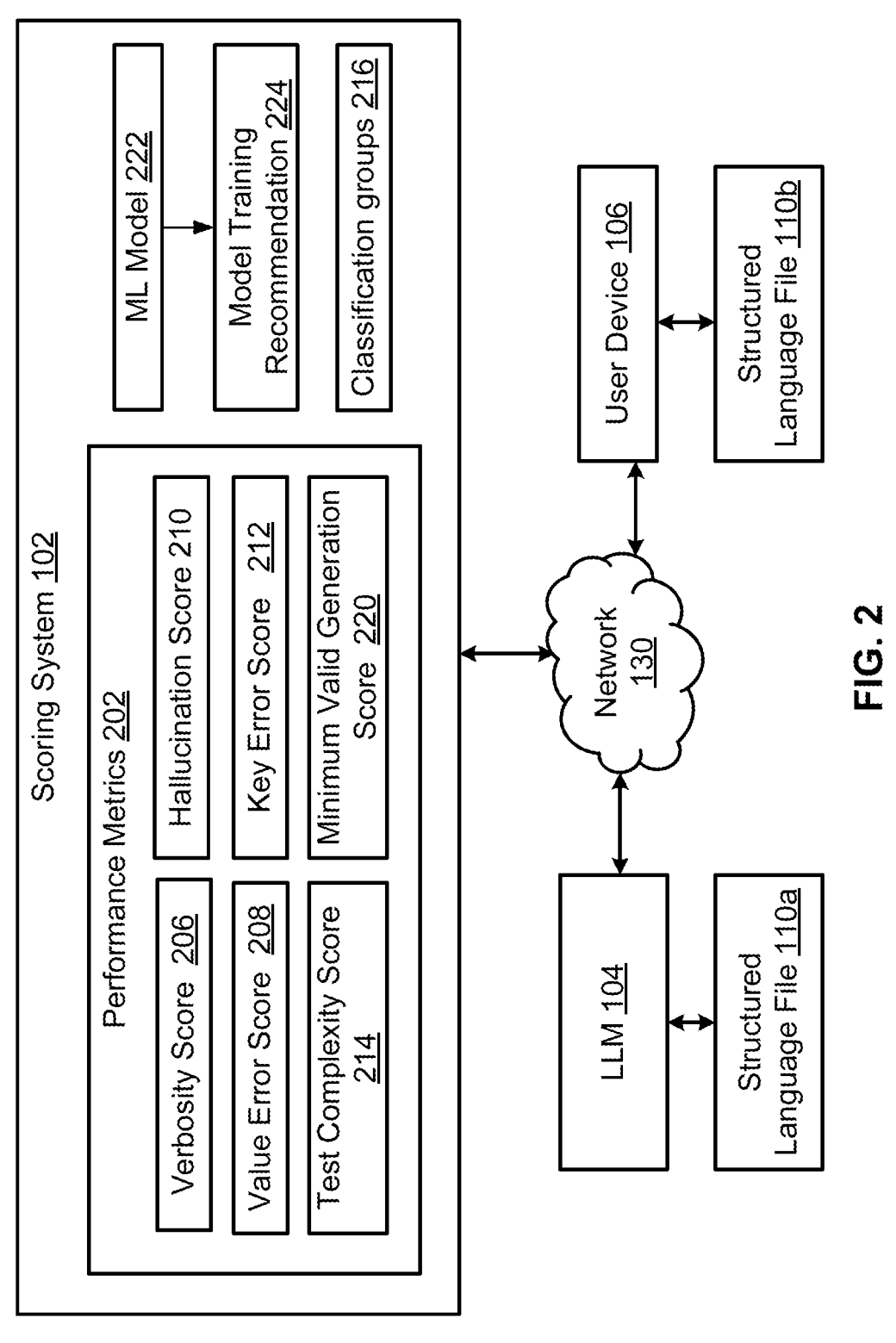
FIG. 2 is a block diagram of another example of the computing environment for generating performance metrics to facilitate LLM operations according to some embodiments of the present disclosure.

FIG. 2 is a block diagram of another example of the computing environment 100 for generating performance metrics 202 to facilitate LLM operations according to some embodiments of the present disclosure. As discussed above with respect to FIG. 1, the scoring system 102 can receive the first structured language file 110a and determine various file metrics 108. The scoring system 102 can then generate performance metrics 202 for the LLM 104 using the file metrics 108.

In some examples, the file metrics 108 can be output as performance metrics 202. For example, the performance metrics can include a minimum truth, a maximum valid truth, a valid key generation, and a valid values generation. The minimum truth can be a minimum set of keys necessary to create a valid structured language file for the resource 132. Thus, the minimum truth 204 can be equivalent to the fundamental key total 116. The maximum valid truth can be equal to the number of valid keys (e.g., fundamental and optional) for the resource 132. Thus, the maximum valid truth can be equivalent to the resource key total 112. The valid key generation can indicate the number of keys generated by the LLM 104 which are the same or similar to a valid key for the resource 132. Thus, the valid key generation can be equivalent to the valid key total 118. Similarly, the valid value generation can indicate the number of values generated by the LLM 104 which are the same or similar to a valid value for the resource 132 (e.g., a value in the set of test values 140). Thus, the valid value generation can be equivalent to the valid value total 128.

Additionally, or alternatively, the performance metrics 202 can be computed using the file metrics 108. For example, the performance metrics 202 can include a hallucination score 210. The hallucination score 210 can provide an estimate of how many invalid keys the LLM 104 added to the first structured language file 110a for the resource 132. To generate the hallucination score 210, the scoring system 102 can determine a difference between the generated key total 114 and the valid key total 118 to produce an invalid key total 120. The scoring system can then compute a ratio of the invalid key total 120 to the resource key total 112.

The performance metrics 202 can also include a minimum valid generation score 220. The minimum valid generation score 220 can indicate how many of the fundamental keys for the resource 132 are in the set of generated keys 134. To generate the minimum valid generation score 220, the scoring system 102 can determine a subset of generated keys in the set of generated keys 134 that match a key in the first subset of resource keys. The scoring system 102 can then compute a difference between a number of generated keys in the subset of generated keys and fundamental key total 116. The minimum valid generation score 220 can then be represented by a ratio of the difference to the fundamental key total 116.

The performance metrics 202 can further include a test complexity score 214. The test complexity score 214 can be a value between zero and one which represents a proportion of the set of resource keys 124 that are used in the first structured language file 110a. Thus, a structure language file with a score closer to one may be more complex than structured language file with a score closer to zero. To generate the test complexity score 214, the scoring system 102 can compute a ratio of a number of test keys in the set of test keys 138 to the resource key total 112.

Furthermore, the performance metrics 202 can include a verbosity score 206. The verbosity score 206 can be a value between zero and one which represents how many additional valid keys the LLM 104 added to the first structured language file 110*a*. In some examples, multiple verbosity scores can be computed for each level of keys in a structured language file. In this way, the ability of the LLM 104 to generate root keys and nested keys can be analyzed separately. To generate the verbosity score 206, the scoring system 102 can compute a first difference between the valid key total 118 and the fundamental key total 116 to determine a number of optional, valid keys included in the first structured language file 110*a*. The scoring system 102 can further compute a second difference between the valid key total 118 and the number of test keys in the set of test keys 138 to determine a number of keys, beyond what is included in the human-generated structured language file (e.g., the second structured language file 110*b*), the LLM 104 added to the first structured language file 110*a*. The scoring system 102 can then compute a third difference between the first and second differences, and a compute a ratio of the third difference to the resource key total 112.

The performance metrics 202 can also include a key error score 212 and a value error score 208. The key error score 212 can represent a difference between the keys in the set of generated keys 134 and the keys in the set of test keys 138. The value error score 208 can represent a difference between the values in the set of generated values 136 and the values in the set of test values 140. To generate the key error score 212, the scoring system 102 can compute a difference between the number of test keys in the set of test keys 138 and the valid key total 118. The scoring system 102 can further compute a ratio of the difference to the number of test keys. Similarly, to generate the value error score 208, the scoring system 102 can compute a difference between the number of test value in the set of test value 140 and the valid value total 128. The scoring system 102 can further compute a ratio of the difference to the number of test values.

In some examples, the performance metrics 202 can further include a number of classification groups 216 (e.g., a true positive group, a true negative group, a false positive group, and a false negative group) to which the first structured language file 110*a* can be mapped. The first structured language file 110*a* can be mapped to the true positive group when the LLM 104 generates a valid resource. That is, the scoring system 102 can map the first structured language file 110*a* to the true positive group in response to determining that all or most of the keys in the set of generated keys 134 match a resource key for the resource 132. The first structured language file 110*a* can be mapped to the true negative group if the LLM 104 generated a valid resource, but for a different resource than the resource 132. That is, the scoring system 102 can map the first structured language file 110*a* in response to determining that all or most of the keys in the set of generated keys 134 are valid keys but are not included in the set of resource keys 124.

The first structured language file 110*a* can be mapped to the false positive group if the LLM 104 generates a structured language file for the correct resource with invalid keys. That is, the scoring system 102 can map the first structured language file 110*a* to the false positive group in response to determining that the first structured language file 110*a* was created with the resource 132, but that all or most of the keys in the set of generated keys 134 are invalid (e.g., the keys in the set of generated keys 134 are incorrectly spelled or otherwise do not match the resource keys in the set of resource keys 124). The first structured language file 110*a* can be mapped to the false negative group if the LLM 104 generates a structured language file for an incorrect resource with invalid keys. That is, the scoring system 102 can map the first structured language file 110*a* to the false negative group in response to determining that the first structured language file 110*a* was not created with the resource 132, and that all or most of the keys in the set of generated keys 134 are invalid (e.g., the keys in the set of generated keys 134 are incorrectly spelled or formatted).

After generating the performance metrics 202, the scoring system 102 can produce a model training recommendation 224 based on the performance metrics 202. The model training recommendation 224 can be used to improve a subsequent structured language file generation by the LLM 104. For example, the model training recommendation 224 may include a recommendation to retrain the LLM 104. In some examples, the recommendation can further include a type of data for the retraining or other suitable information. The scoring system 102 may include a machine learning (ML) model 222 trained to output the model training recommendation 224 based on the performance metrics 202. For example, the ML model 222 may be trained on a dataset consisting of performance metrics for various LLM-generated structured language files and a corresponding action performed with respect to an LLM to improve structured language file generation. Additionally, or alternatively, the model training recommendation 224 can include a recommendation to deploy the LLM 104 or to remove the LLM 104 from deployment.

In some examples, the scoring system 102 can receive various structured language files generated by the LLM 104. The scoring system 102 can then generate the performance metrics 202 for each structured language file and can map each structured language file to one of the classification groups. Then, a number of the structured language files mapped to each group can be used to calculate an accuracy of the LLM 104, a recall of the LLM 104, or to otherwise analyze the ability of the LLM 104 to generate structured language files. Similarly, the performance metrics 202 can be analyzed to evaluate the ability of the LLM 104 to generate structured language files. For example, there may be threshold values associated with each performance metric, and the scoring system 102 may compare each performance metric to the corresponding threshold. Furthermore, in some examples, each of the structured language files can be a particular type of structured language file (e.g., a YAML file). Thus, the scoring system 102 may analyze the ability of the LLM 104 to generate the particular types of structured language files. As a result, the scoring system 102 can determine types of structured languages for which the LLM 104 can accurately generate files or for which the LLM 104 may require further training.

In other examples, another AI model (e.g., a recurrent neural network, a transformer-based model, a reinforcement learning model, a generative adversarial network, etc.) can be used to generate structured language files. In such examples, the scoring system 102 can perform any combination of the operations described above in FIGS. 1-2. For example, the scoring system 102 can receive a structured language file generated by the AI model, and, in response, the scoring system 102 can generate file metrics, performance metrics, and a model training recommendation.

Figure 3:
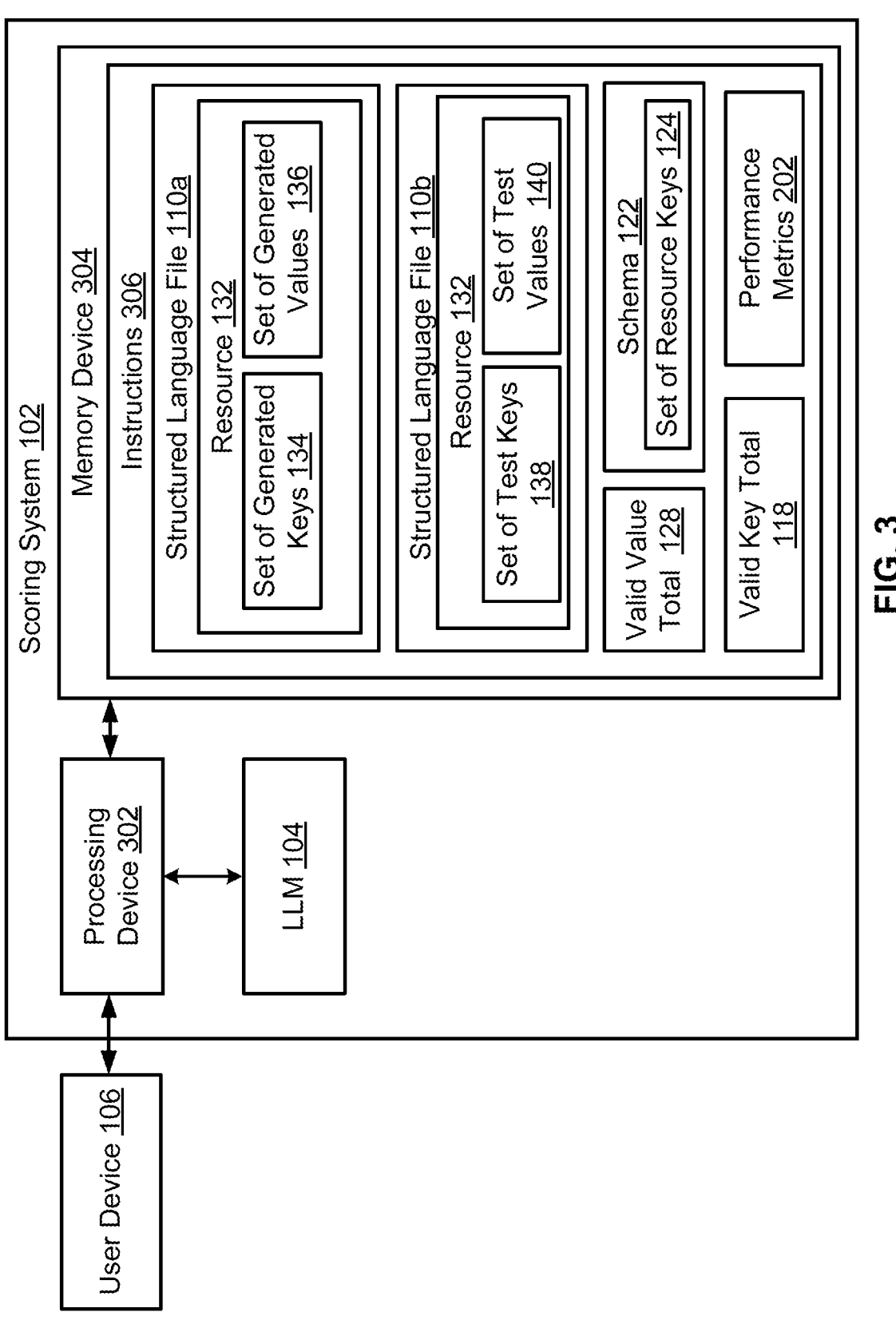
FIG. 3 is a block diagram of an example of a scoring system for generating performance metrics to facilitate LLM operations according to some embodiments of the present disclosure.

FIG. 3 is a block diagram of an example of a scoring system 102 for generating performance metrics 202 to facilitate LLM operations according to some embodiments of the present disclosure. The scoring system 102 can include a processing device 302 communicatively coupled to a memory device 304.

The processing device 302 can include one processing device or multiple processing devices. The processing device 302 can be referred to as a processor. Non-limiting examples of the processing device 302 include a Field-Programmable Gate Array (FPGA), an application-specific integrated circuit (ASIC), and a microprocessor. The processing device 302 can execute instructions 306 stored in the memory device 304 to perform operations. In some examples, the instructions 306 can include processor-specific instructions generated by a compiler or an interpreter from code written in any suitable computer-programming language, such as C, C++, C#, Java, Python, or any combination of these.

The memory device 304 can include one memory device or multiple memory devices. The memory device 304 can be non-volatile and may include any type of memory device that retains stored information when powered off. Non-limiting examples of the memory device 304 include electrically erasable and programmable read-only memory (EE-PROM), flash memory, or any other type of non-volatile memory. At least some of the memory device 304 includes a non-transitory computer-readable medium from which the processing device 302 can read instructions 306. A computer-readable medium can include electronic, optical, magnetic, or other storage devices capable of providing the processing device 302 with the instructions 306 or other program code executable to perform operations. Non-limiting examples of a computer-readable medium include magnetic disk(s), memory chip(s), ROM, random-access memory (RAM), an ASIC, a configured processor, and optical storage.

In some examples, the processing device 302 can execute the instructions 306 to perform operations. For example, the processing device 302 can receive a first structured language file 110a generated by a large language model (LLM) 104. The first structured language file 110a can include a set of generated keys 134 and a corresponding set of generated values 126. The set of generated keys 134 and the set of generated values 136 can be associated with a resource 132. The processing device 302 can further receive a second structured language file 110b. The second structured language file 110b can be a human-generated structured language file and can include set of test keys 138 and a corresponding set of test values 140 associated with the resource 132. The processing device 302 can extract, from a schema 122 for the resource 132, a set of resource keys 124. The processing device 302 can determine, based on a comparison of the set of generated keys 134 and the set of resource keys 124, a valid key total 118 representative of a number of keys in the set of generated keys 134 that are valid. Additionally, the processing device 302 can determine, based on a comparison of the set of generated values 136 and the set of test values 140, a valid value total 128 representative of a number of values in the set of generated values that are valid. The processing device 302 can then generate a plurality of performance metrics 202 for the LLM 104 and transmit the performance metrics 202 to a user device 106. Each of the performance metrics 202 can depend at least in part the valid key total 118 or the valid value total 128.

FIG. 4 is a flowchart of an example of a process 400 for generating performance metrics 202 to facilitate LLM operations according to some embodiments of the present disclosure. In some examples, the processing device 302 can perform one or more of the steps shown in FIG. 4. For example, the processing device 302 can execute the scoring system 102 of FIGS. 1 and 2 to perform one or more of the steps shown in FIG. 4. In other examples, the processing device 302 can implement more steps, fewer steps, different steps, or a different order of the steps depicted in FIG. 4. The steps of FIG. 4 are described below with reference to components discussed above in FIGS. 1-3.

At block 402, the processing device 302 can receive a first structured language file 110a generated by a LLM 104. The first structured language file 110a can comprise a set of generated keys 134 and a set of generated values 136. The set of generated keys 134 and the set of generated values 136 can be associated with a resource 132. In an example, the first structured language file 110a can be a Kubernetes deployment YAML file, which can orchestrate deployment of containerized applications. Thus, the resource 132 can be a deployment resource and the set of generated keys 134 and the set of generated values 136 can outline an instance of the deployment resource.

At block 404, the processing device 302 can receive a second structured language file 110b. The second structured language file 110b can be generated by a user and can include a set of test keys 138 and a set of test values 140 associated with the resource 132. In the example, the second structured language file 110b can also be a Kubernetes deployment YAML file. Thus, the resource 132 can be the deployment resource and the set of test keys 138 and the set of test values 140 can outline another instance of the deployment resource.

At block 406, the processing device 302 can extract, from a schema 122 for the resource 132, a set of resource keys 124. The schema 122 can outline a structure (e.g., by detailing the name and purpose of each key that can be used in a file for that resource) of a Kubernetes deployment YAML file. For example, the schema may specify that top-fields in a Kubernetes deployment YAML file include an API version key which specifies a version of the API being used, a kind key which specifies the kind of object being created, a metadata key which includes metadata about the object such as the object's name, and a spec which specifies a desired state of the deployment. Then, within each of the top-fields (also referred to herein as root keys), the schema 122 can define nested keys. The schema 122 can further define which of the nested keys are fundamental (e.g., mandatory to create a valid instance of the deployment resource) and which of the nested keys are optional. For example, a fundamental nested key under the metadata key can be a name key and an optional nested key under the metadata key can be one or more label keys. In the example, the root keys may also be considered fundamental keys. Therefore, based on the schema 122, the set of resource keys 124 can include the API version key, the metadata key, the kind key, the spec key, and the nested keys associated with each root key.

At block 408, the processing device 302 can determine, based on a comparison of the set of generated keys 134 and the set of resource keys 124, a valid key total 118 representative of a number of keys in the set of generated keys 134 that are valid. In the example, each of the root and nested keys can be compared with the keys in the set of resource keys 124. As a result, the processing device 302 can identify a first subset of the generated keys 134 that do not match or at least partially match any of the resource keys 124 and second subset of the generated keys 134 which do match or at least partially match one of the resource keys 124. The valid key total 118 can therefore be a number of keys in the second subset.

A partial match may involve the resource key being a word (e.g., name) and the generated key having single quotes (e.g., 'name'), double quotes, a hyphen, an underscore, or another suitable character which does not render the key invalid. Examples which may render the key invalid and therefore may not count as a partial match can include the generated key having different capitalization or spelling than any of the resource keys.

At block 410, the processing device 302 can determine, based on a comparison of the set of generated values 136 and the set of test values 140, a valid value total 128. The valid value total 128 can be representative of a number of values in the set of generated values 136 that are valid. In the example, each of value of the set of generated values 136 can be compared the values in the set of test values 140. As a result, the processing device 302 can identify a first subset of the values that do not match or at least partially match any of the test values 140 and second subset of key identify that do match or at least partially match one of the test values 140. The valid value total 128 can therefore be a number of values in the second subset. To determine whether a value is match or at least partial match to a test value, the processing device 302 can use regular expression (regex).

At block 412, the processing device 302 can generate a plurality of performance metrics 202 for the LLM 104 and transmit the plurality of performance metrics to the user device 106. Each of the performance metrics 202 can depend least in part on the valid key total 118 or the valid value total 128. The performance metrics 202 can include a hallucination score 210, a minimum valid generation score 220, a test complexity score 214, a verbosity score 206, a key error score 212, and a value error score 208. The performance metrics 202 can be used to make a decision regarding the training or deployment of the LLM 104. For example, based on all or some of the performance metrics 202 being below corresponding thresholds, the processing device 302 may deploy the LLM 104.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A system comprising:
a processing device; and
a memory device that stores instructions executable by the processing device for causing the processing device to perform operations comprising:
receiving a first structured language file generated by a large language model, wherein the first structured language file comprises a set of generated keys associated with a resource and a set of generated values associated with the resource;
receiving a second structured language file generated by a user, wherein the second structured language file comprises a set of test keys associated with the resource and a set of test values associated with the resource;
extracting, from a schema for the resource, a set of resource keys;
determining, based on a comparison of the set of generated keys and the set of resource keys, a valid key total representative of a number of valid keys in the set of generated keys;
determining, based on a comparison of the set of generated values and the set of test values, a valid value total representative of a number of valid values in the set of generated values;
generating a first plurality of performance metrics for the first structured language file generated by the large language model and transmitting the first plurality of performance metrics to a user device, wherein each performance metric in the first plurality of performance metrics depends on the valid key total or the valid value total;
determining, based on the first plurality of performance metrics, a model training recommendation;
executing a training process of the large language model that uses training data selected based on the model training recommendation to modify one or more internal data structures of the large language model; and
subsequent to executing the training process of the large language model, deploying and executing the large language model on the user device and generating, by the large language model executing on the user device, a third structured language file, wherein a second plurality of performance metrics indicate that the third structured language file is more accurate than the first structured language file.

2. The system of claim 1, wherein the first plurality of performance metrics comprise a hallucination score, and wherein the operation of generating the first plurality of performance metrics comprises computing the hallucination score by:
determining a resource key total representative of a number of keys in the set of resource keys;
determining a generated key total representative of a number of keys in the set of generated keys;
computing a difference between the generated key total and the valid key total to produce an invalid key total; and
computing a ratio of the invalid key total to the resource key total.

3. The system of claim 1, wherein the first plurality of performance metrics comprise a key error score and a value error score, and wherein the operation of generating the first plurality of performance metrics comprises:
computing the key error score based on a number of keys in the set of test keys and the valid key total; and
computing the value error score based on a number of values in the set of test values and the valid value total.

4. The system of claim 1, wherein the set of resource keys comprise a subset of fundamental resource keys, wherein the first plurality of performance metrics comprise a verbosity score, and wherein the operation of generating the first plurality of performance metrics comprises computing the verbosity score by:
determining a resource key total representative of a number of keys in the set of resource keys;
determining a fundamental key total representative of a number of keys in the subset of fundamental resource keys;
computing a first difference between the valid key total and the fundamental key total;
computing a second difference between the valid key total and a number of keys in the set of test keys;
computing a third difference between the first difference and the second difference; and
computing a ratio of the third difference to the resource key total.

5. The system of claim 1, wherein the set of resource keys comprise a subset of fundamental resource keys, wherein the first plurality of performance metrics comprise a minimum valid generation score, and wherein the operation of generating the first plurality of performance metrics comprises computing the minimum valid generation score by:

determining a subset of generated keys in the set of generated keys that match a key in the subset of fundamental resource keys;

determining a fundamental key total representative of a number of keys in the subset of fundamental resource keys;

computing a difference between a number of keys in the subset of generated keys and the fundamental key total; and computing a ratio of the difference to the fundamental key total.

6. The system of claim 1, wherein the operations further comprise:

mapping the first structured language file to a classification group of a plurality of classification groups, wherein the plurality of classification groups comprise a true positive group, a true negative group, a false positive group, and a false negative group.

7. The system of claim 1, wherein the first plurality of performance metrics comprise a test complexity score, and wherein the operation of generating the first plurality of performance metrics comprises computing the test complexity score by:

determining a resource key total representative of a number of keys in the set of resource keys; and computing a ratio of a number of keys in the set of test keys to the resource key total.

8. A computer-implemented method comprising:

receiving a first structured language file generated by a large language model, wherein the first structured language file comprises a set of generated keys associated with a resource and a set of generated values associated with the resource;

receiving a second structured language file generated by a user, wherein the second structured language file comprises a set of test keys associated with the resource and a set of test values associated with the resource;

extracting, from a schema for the resource, a set of resource keys;

determining, based on a comparison of the set of generated keys and the set of resource keys, a valid key total representative of a number of valid keys in the set of generated keys;

determining, based on a comparison of the set of generated values and the set of test values, a valid value total representative of a number of valid values in the set of generated values;

generating a first plurality of performance metrics for the first structured language file generated by the large language model and transmitting the first plurality of performance metrics to a user device, wherein each performance metric in the first plurality of performance metrics depends on the valid key total or the valid value total;

determining, based on the first plurality of performance metrics, a model training recommendation;

executing a training process of the large language model that uses training data selected based on the model training recommendation to modify one or more internal data structures of the large language model; and subsequent to executing the training process of the large language model, deploying and executing the large language model on the user device and generating, by the large language model executing on the user device, a third structured language file, wherein a second plurality of performance metrics indicate that the third structured language file is more accurate than the first structured language file.

9. The computer-implemented method of claim 8, wherein the first plurality of performance metrics comprise a hallucination score, and wherein generating the first plurality of performance metrics comprises computing the hallucination score by:

determining a resource key total representative of a number of keys in the set of resource keys;

determining a generated key total representative of a number of keys in the set of generated keys;

computing a difference between the generated key total and the valid key total to produce an invalid key total; and computing a ratio of the invalid key total to the resource key total.

10. The computer-implemented method of claim 8, wherein the first plurality of performance metrics comprise a key error score and a value error score, and wherein generating the first plurality of performance metrics comprises:

computing the key error score based on a number of keys in the set of test keys and the valid key total; and computing the value error score based on a number of values in the set of test values and the valid value total.

11. The computer-implemented method of claim 8, wherein the set of resource keys comprise a subset of fundamental resource keys, wherein the first plurality of performance metrics comprise a verbosity score, and wherein generating the first plurality of performance metrics comprises computing the verbosity score by:

determining a resource key total representative of a number of keys in the set of resource keys;

determining a fundamental key total representative of a number of keys in the subset of fundamental resource keys;

computing a first difference between the valid key total and the fundamental key total;

computing a second difference between the valid key total and a number of keys in the set of test keys;

computing a third difference between the first difference and the second difference; and computing a ratio of the third difference to the resource key total.

12. The computer-implemented method of claim 8, wherein the set of resource keys comprise a subset of fundamental resource keys, wherein the first plurality of performance metrics comprise a minimum valid generation score, and wherein generating the first plurality of performance metrics comprises computing the minimum valid generation score by:

determining a subset of generated keys in the set of generated keys that match a key in the subset of fundamental resource keys;

determining a fundamental key total representative of a number of keys in the subset of fundamental resource keys;

computing a difference between a number of keys in the subset of generated keys and the fundamental key total; and computing a ratio of the difference to the fundamental key total.

13. The computer-implemented method of claim 8, further comprising:

mapping the first structured language file to a classification group of a plurality of classification groups, wherein the plurality of classification groups comprise a true positive group, a true negative group, a false positive group, and a false negative group.

14. A non-transitory computer-readable medium storing instructions that are executable by a processing device for causing the processing device to perform operations comprising:

receiving a first structured language file generated by a large language model, wherein the first structured language file comprises a set of generated keys associated with a resource and a set of generated values associated with the resource;

receiving a second structured language file generated by a user, wherein the second structured language file comprises a set of test keys associated with the resource and a set of test values associated with the resource;

extracting, from a schema for the resource, a set of resource keys;

determining, based on a comparison of the set of generated keys and the set of resource keys, a valid key total representative of a number of valid keys in the set of generated keys;

determining, based on a comparison of the set of generated values and the set of test values, a valid value total representative of a number of valid values in the set of generated values;

generating a first plurality of performance metrics for the first structured language file generated by the large language model and transmitting the first plurality of performance metrics to a user device, wherein each performance metric in the first plurality of performance metrics depends on the valid key total or the valid value total;

determining, based on the first plurality of performance metrics, a model training recommendation;

executing a training process of the large language model that uses training data selected based on the model training recommendation to modify one or more internal data structures of the large language model; and subsequent to executing the training process of the large language model, deploying and executing the large language model on the user device and generating, by the large language model executing on the user device, a third structured language file, wherein a second plurality of performance metrics indicate that the third structured language file is more accurate than the first structured language file.

15. The non-transitory computer-readable medium of claim 14, wherein the first plurality of performance metrics comprise a hallucination score, and wherein the operation of generating the first plurality of performance metrics comprises computing the hallucination score by:

determining a resource key total representative of a number of keys in the set of resource keys;

determining a generated key total representative of a number of keys in the set of generated keys;

computing a difference between the generated key total and the valid key total to produce an invalid key total; and computing a ratio of the invalid key total to the resource key total.

16. The non-transitory computer-readable medium of claim 14, wherein the first plurality of performance metrics comprise a key error score and a value error score, and wherein the operation of generating the first plurality of performance metrics comprises:

computing the key error score based on a number of keys in the set of test keys and the valid key total; and computing the value error score based on a number of values in the set of test values and the valid value total.

17. The non-transitory computer-readable medium of claim 14, wherein the set of resource keys comprise a subset of fundamental resource keys, wherein the first plurality of performance metrics comprise a verbosity score, and wherein the operation of generating the first plurality of performance metrics comprises computing the verbosity score by:

determining a resource key total representative of a number of keys in the set of resource keys;

determining a fundamental key total representative of a number of keys in the subset of fundamental resource keys;

computing a first difference between the valid key total and the fundamental key total;

computing a second difference between the valid key total and a number of keys in the set of test keys;

computing a third difference between the first difference and the second difference; and computing a ratio of the third difference to the resource key total.

* * * * *